United States Patent
Kalliske et al.

(10) Patent No.: US 7,614,472 B2
(45) Date of Patent: Nov. 10, 2009

(54) SYSTEM FOR DEVIATING PART OF THE EXTERNAL PANELING OF A MOTOR VEHICLE

(75) Inventors: Ingo Kalliske, Berlin (DE); Sami Al-Samarae, Berlin (DE); Daniel Hahn, Berlin (DE); Jens Schlönvoight, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 502 days.

(21) Appl. No.: 10/520,627

(22) PCT Filed: Jun. 25, 2003

(86) PCT No.: PCT/DE03/02153

§ 371 (c)(1), (2), (4) Date: Jun. 30, 2005

(87) PCT Pub. No.: WO2004/007247

PCT Pub. Date: Jan. 22, 2004

(65) Prior Publication Data

US 2006/0060408 A1 Mar. 23, 2006

(30) Foreign Application Priority Data

Jul. 10, 2002 (DE) ................................. 102 31 796
Jul. 26, 2002 (DE) ................................. 102 34 897

(51) Int. Cl.
*B60K 28/10* (2006.01)
*B60T 7/12* (2006.01)

(52) U.S. Cl. .................... 180/274; 180/282; 296/193.11

(58) Field of Classification Search ............... 180/274, 180/282; 280/734, 735; 296/193.11
See application file for complete search history.

(56) References Cited

U.S. PATENT DOCUMENTS

| | | | |
|---|---|---|---|
| 5,697,467 A | 12/1997 | Howard | |
| 5,785,368 A | 7/1998 | Hartmann et al. | |
| 6,139,048 A | 10/2000 | Braunschadel | |
| 6,182,782 B1 | 2/2001 | Matsuura et al. | |
| 6,293,362 B1 * | 9/2001 | Sasaki et al. | 180/274 |
| 6,364,402 B1 * | 4/2002 | Sasaki | 296/187.09 |
| 6,415,883 B1 * | 7/2002 | Myrholt et al. | 180/274 |
| 6,499,555 B2 * | 12/2002 | Ishizaki et al. | 180/274 |
| 6,513,617 B2 * | 2/2003 | Sasaki et al. | 180/274 |
| 6,520,276 B2 * | 2/2003 | Sasaki et al. | 180/274 |
| 6,554,093 B2 * | 4/2003 | Sasaki et al. | 180/274 |
| 6,600,412 B2 * | 7/2003 | Ishizaki et al. | 340/436 |
| 6,802,556 B2 * | 10/2004 | Mattsson et al. | 296/187.09 |
| 6,827,170 B2 * | 12/2004 | Hamada et al. | 180/274 |

(Continued)

FOREIGN PATENT DOCUMENTS

DE       694 00 889 T2    12/1994

(Continued)

*Primary Examiner*—Toan C To
(74) *Attorney, Agent, or Firm*—Foley & Lardner LLP

(57) ABSTRACT

The invention relates to a system for deviating part of an external panel of a motor vehicle, during an accident to reduce the impact energy of a person colliding with deviated part of the external panel. The part is displaced in a deviation direction that is opposite to that of an impact direction of the person. The system includes a device for deviating the part. The device is engaged at least at one point on the part and permits a displacement of the part in the impact direction, if a person collides with the part.

41 Claims, 11 Drawing Sheets

U.S. PATENT DOCUMENTS

| | | | |
|---|---|---|---|
| 6,857,495 B2 * | 2/2005 | Sawa | 180/274 |
| 6,880,666 B2 * | 4/2005 | Kikuchi et al. | 180/274 |
| 2002/0011372 A1 | 1/2002 | Sasaki et al. | |
| 2002/0014367 A1 * | 2/2002 | Sasaki et al. | 180/274 |

FOREIGN PATENT DOCUMENTS

| | | |
|---|---|---|
| DE | 195 12 600 A1 | 10/1996 |
| DE | 100 20 658 A1 | 10/2001 |
| DE | 100 21 143 A1 | 10/2001 |
| DE | 101 02 760 A1 | 7/2002 |
| DE | 101 08 882 A1 | 9/2002 |
| EP | 0 967 128 A2 | 12/1999 |
| GB | 2 372 536 A | 8/2002 |
| JP | 58-211975 | 12/1983 |
| JP | 11-222097 A | 8/1999 |
| JP | 11-310157 A | 11/1999 |
| JP | 2000-079859 A | 3/2000 |
| JP | 2000-203377 | 7/2000 |
| JP | 2001-277991 A | 10/2001 |
| JP | 2002-029369 A | 1/2002 |
| WO | WO 01/23225 A1 | 4/2001 |

\* cited by examiner

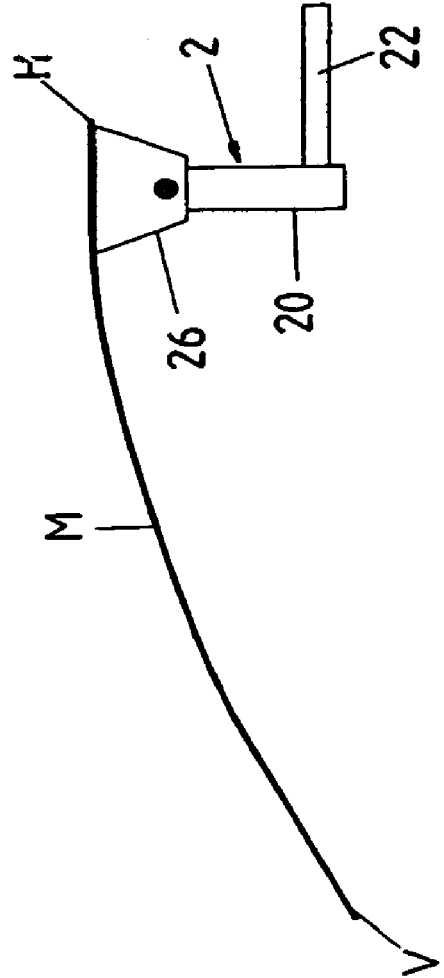
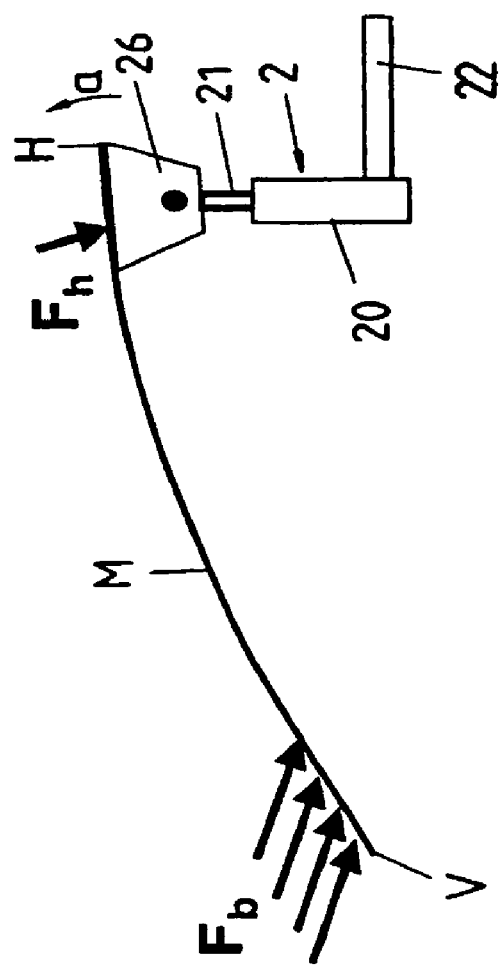

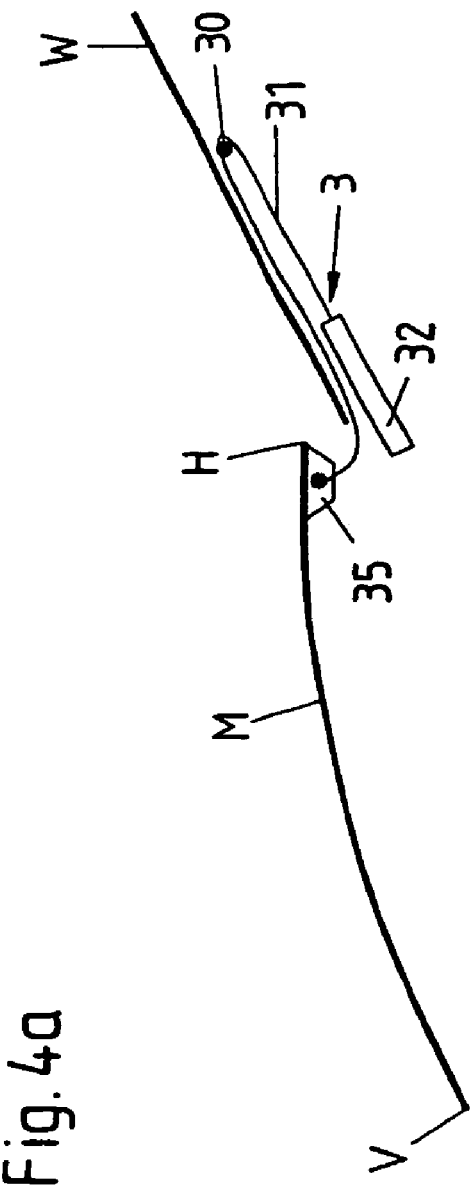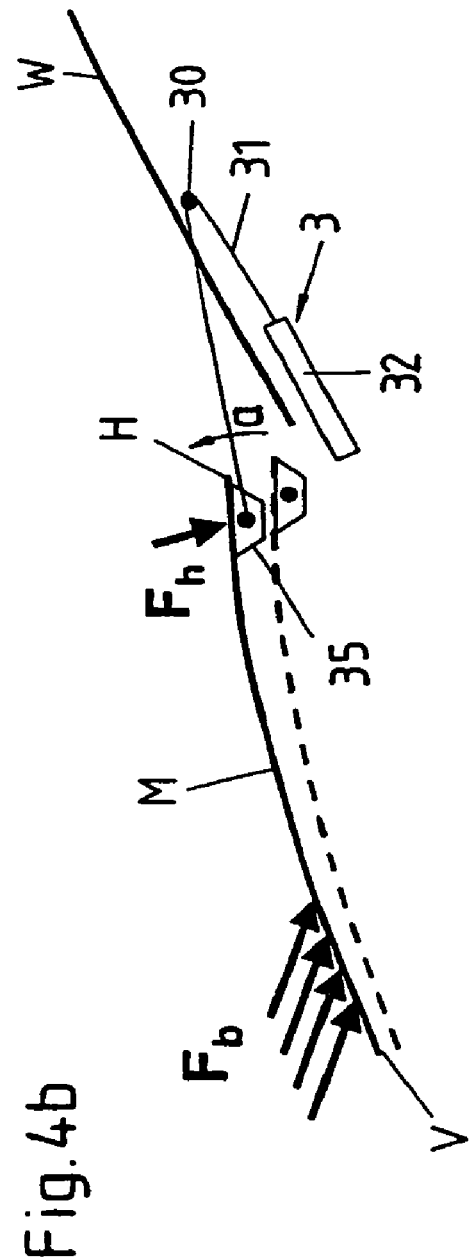

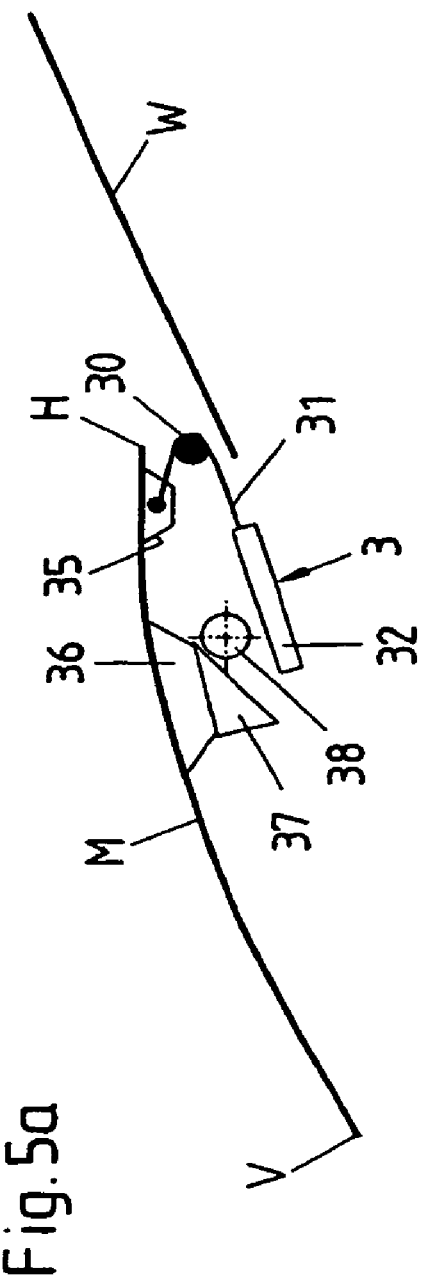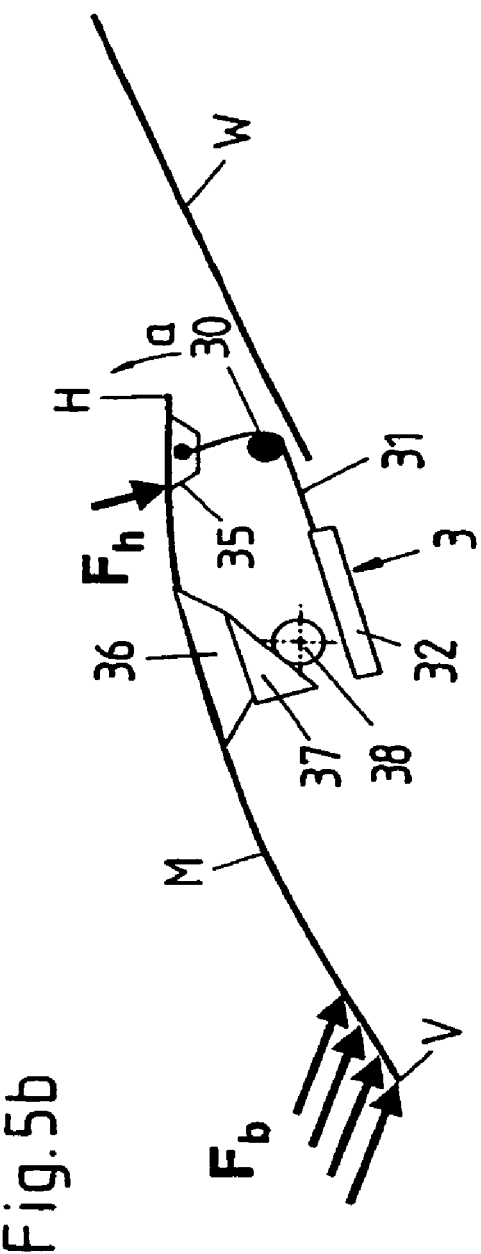

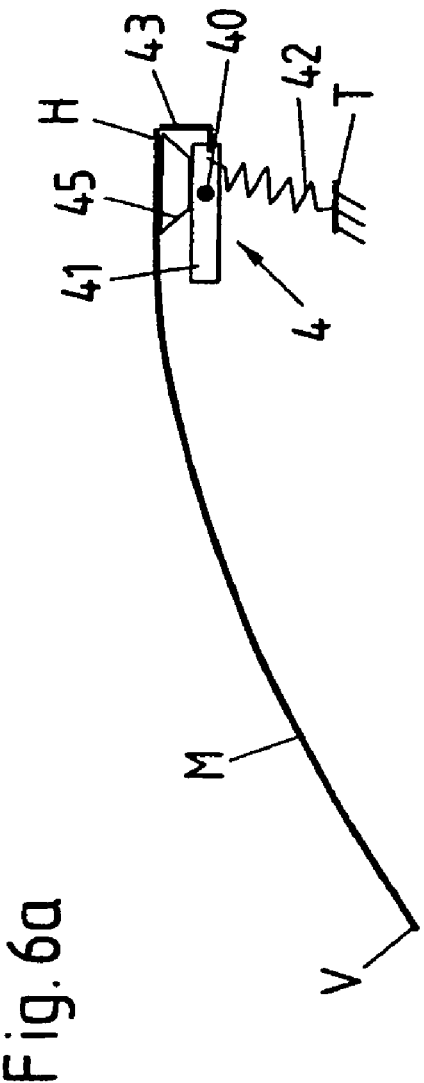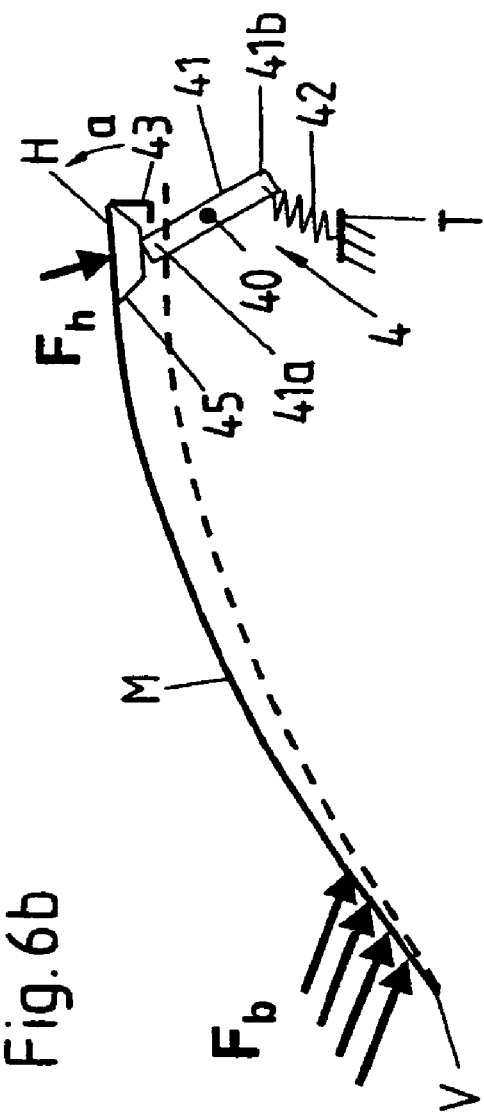

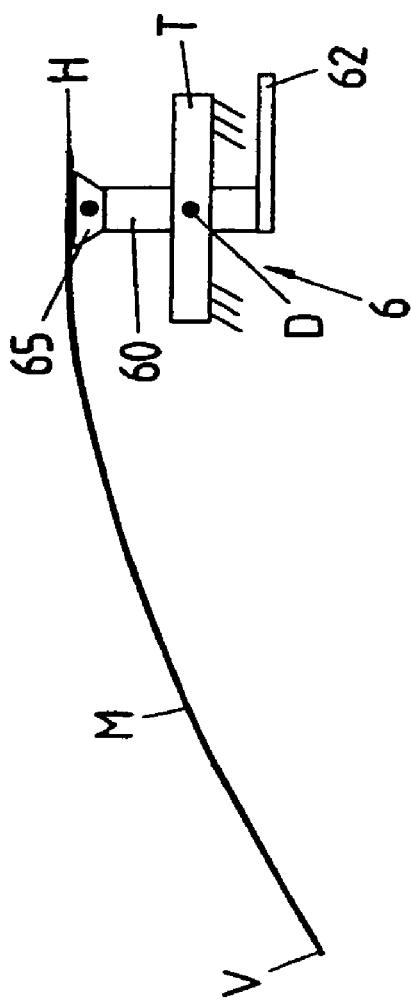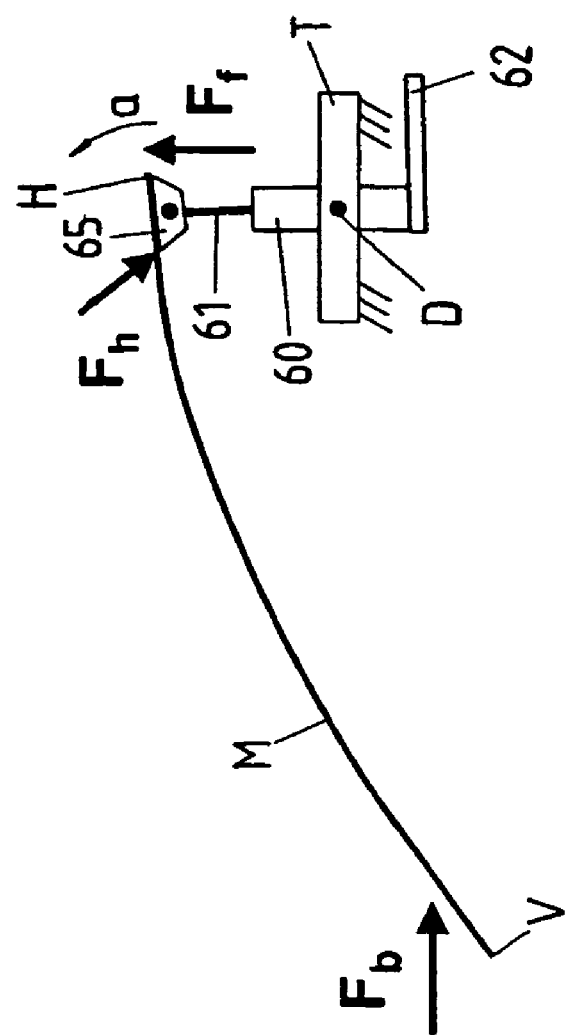

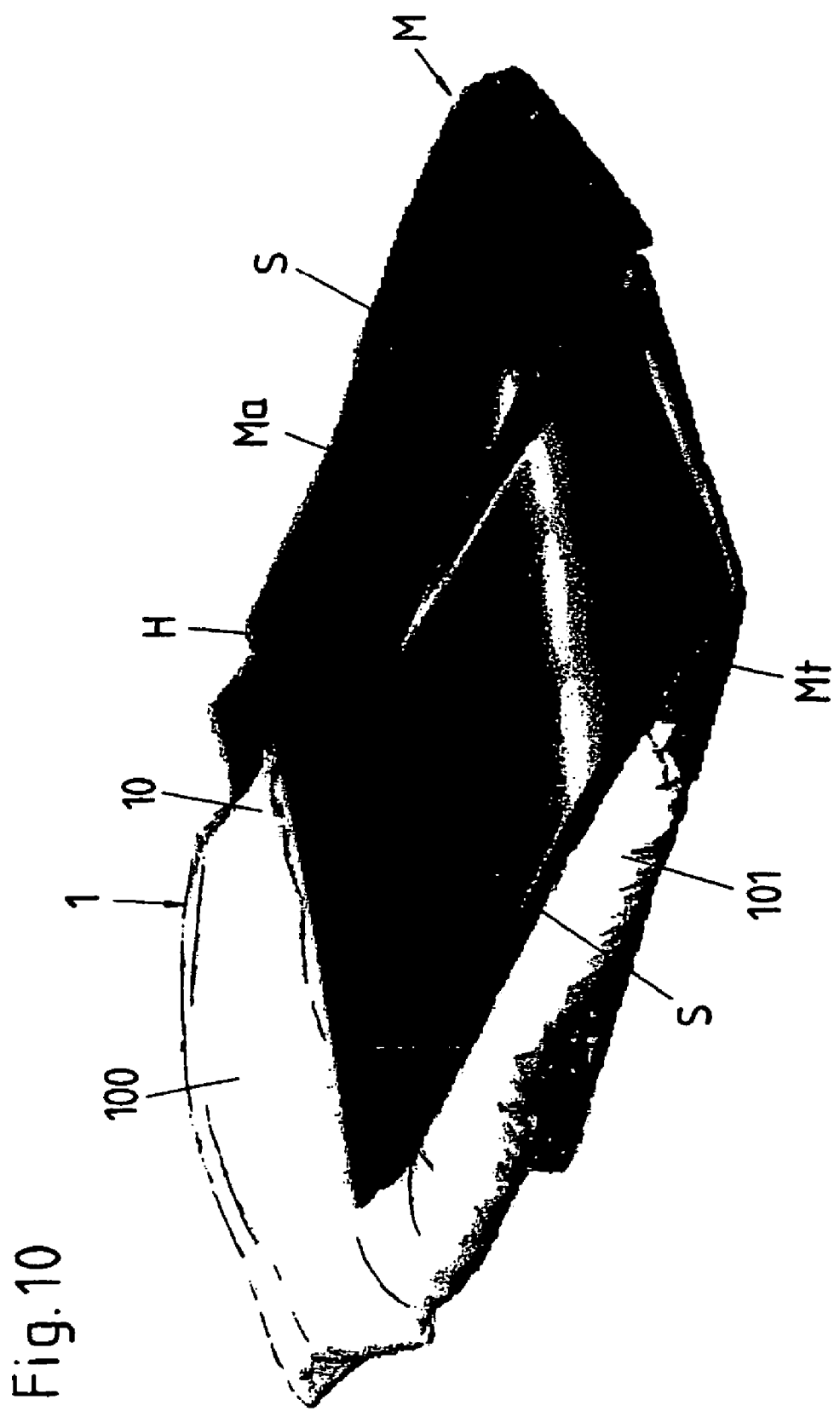

SYSTEM FOR DEVIATING PART OF THE EXTERNAL PANELING OF A MOTOR VEHICLE

BACKGROUND

The invention relates to an arrangement for deflecting part of the external paneling of a motor vehicle in the event of a crash.

The deflection of part of the external paneling of the motor vehicle toward the outside in the event of a crash is intended to dissipate the impact energy of a person (e.g., a pedestrian or cyclist) in a controlled manner. The impact energy of the person is dissipated by movement of the deflected part in a deflecting direction that is counter to an impact direction of the person, thereby reducing the likelihood of the person coming into contact with rigid motor vehicle elements positioned behind the external paneling, such as, for example, an engine block. To this end, a typical arrangement comprises a device for deflecting the part of the external paneling, which device acts on at least one point of this part and which, during the impact of a person, permits a movement of this part counter to the deflecting direction, thereby dissipating impact energy.

An arrangement of this type is disclosed, for example, in WO 01/23 225 A1 (incorporated by reference herein), which describes a device for raising the engine hood of a motor vehicle in the event of crash, which can be detected by a pre-crash sensor. The sensor triggers a raising of the engine hood if it detects a directly imminent, unavoidable accident. A person impacting against the engine hood, as a consequence of this accident, is protected (by the raising of the engine hood) from coming into contact with the engine block situated under the hood.

As the impact of a person against the engine hood (and the associated impact forces) leads to a movement of the engine hood counter to the deflecting direction (i.e. the impact and associated forces lead to a counter deflection of the engine hood toward the engine block), energy may be dissipated in a controlled manner. As a result, the risk of injury is reduced in comparison with a direct impact against a rigid part of the motor vehicle.

However, a problem with this arrangement is that the impact of a person against the external paneling of a motor vehicle (e.g., against the engine hood thereof) frequently takes place in a number of steps. For example, during the usual kinematic sequence of a collision between a pedestrian and vehicle, the impact of the pedestrian's head against the engine hood is generally preceded by an impact of the pedestrian's upper body. The impact of the upper body (and its associated impact energy) may result in the previously deflected engine hood being lowered back against the engine block. As a result, there may no longer sufficient protective potential for the subsequent impact of the head. However, it is the protection of the head of a person (e.g., pedestrian or cyclist) colliding with the vehicle that is of particular importance.

SUMMARY

The embodiments of the invention described herein improve upon the conventional arrangement by accounting for multiple impact stages. As a result, the invention accounts for and dissipates, for example, the impact energy of a pedestrian's head after accounting for and dissipating, for example, the impact energy of the pedestrian's upper body.

In accordance therewith, the deflecting device serving for deflecting part of the external paneling of the motor vehicle can be controlled as a function of the location, the time and/or the direction of the impact in such a manner that, as a function of the instant of the impact (after the triggering of the deflecting device or after a preceding first impact) against the part of the external paneling and/or as a function of the location of the impact against the deflected part of the external paneling and/or as a function of the direction of the impact against the deflected part of the external paneling, the deflecting device permits or does not permit a movement of the part of the external paneling counter to the deflecting direction.

This makes it possible to control the deflecting device as a function of experimental values concerning the time sequence of the impact of the upper body of a person, on the one hand, and of his head, on the other hand, and as a function of experimental values concerning the location and the direction of the impact of the upper body, on the one hand, and of the head, on the other hand, in such a manner that it permits a movement counter to the deflecting direction specifically at the moment when, according to the available experimental values, the head of a person situated outside the vehicle is striking against the deflected part of the external paneling of the vehicle, for example against a deflected engine hood.

On account of the mobility and deformability of the deflected part of the external paneling, the feature according to which the deflecting device permits or does not permit a movement of the part of the external paneling counter to the deflecting direction is not absolutely to be understood within the meaning of either a movement of the external paneling taking place or alternatively no movement thereof at all taking place. On the contrary, depending on the severity of the impact, a certain movement is imposed on the system even in those cases in which no movement per se of the external paneling counter to the deflecting direction is to take place. Rather, the crucial factor for the feature is for the deflecting device to be controlled in such a manner that, under given conditions (as a function of the instant, the location and the direction of the impact), opens up the possibility of a movement of the part of the external paneling counter to the deflecting direction or opposes this movement in order as far as possible to prevent it.

The solution according to the invention firstly provides, by part of the external paneling being deflected, a deformation distance in order to dissipate the energy transmitted by the head of a pedestrian or a cyclist to the external paneling to an acceptable level without his head coming into contact with rigid vehicle parts situated behind the external paneling, such as, for example, the engine block. In this case, the effect achieved by controlling the deflecting device is that this deformation distance is not already used up during an impact of the upper body that precedes the impact of the head. On the contrary, the available deformation distance is not as far as possible to be reduced during an impact of the upper body that precedes the impact of the head.

An accident which leads to the deflecting device being activated can be detected by a contact sensor or a proximity sensor (pre-crash sensor). Upon detection of an accident, the corresponding sensor produces a signal causing the deflecting device to deflect the corresponding part of the motor vehicle outward. In this case, the activation of the deflecting device and the impact of the head must not coincide in time. This causes correspondingly short deflecting times. To this end, the corresponding part of the external paneling of the motor vehicle, for example the engine hood, is to be designed in such a manner that it can be brought into the deflected position (protective position) without permanent deformation. On the other hand, the external paneling must not, however, be of such rigid design that the load limit values of the head are exceeded solely because of the rigidity of the external paneling.

In particular, the external paneling has to be of sufficiently flexible design even in the region of the points on which the deflecting device acts, so that the load limit values for the head are not exceeded.

Overall, the arrangement according to the invention results in a uniform and low loading of the head during the impact against part of the external paneling of a motor vehicle, in order to avoid serious head injuries.

To control the deflecting device as a function of the instant of the impact, provision may be made for the deflecting device to permit a movement of the deflected part of the external paneling counter to the deflecting direction only after a specified period of time has elapsed since the activation of the deflecting device by the force with which the deflecting device acts on the deflected part of the external paneling being time-controlled. The control takes place here in such a manner that the force with which the deflecting device acts on the external paneling decreases with time after the deflection of the part of the external paneling. This means that, upon an impact of the upper body of a person directly after part of the external paneling has been deflected, the force applied by the deflecting device is still sufficiently large in order to prevent a restoring movement of the part of the external paneling. During the subsequent impact of the head, the force has decreased sufficiently now for it to be possible for energy to be dissipated in a controlled manner by the part of the external paneling moving counter to the deflecting direction and therefore counter to the direction of action of the pressure.

To this end, use may be made of a deflecting device which deflects the part of the external paneling which is to be deflected under the action of the pressure of a fluid, in particular of a gas, the pressure of the fluid being time-controlled and decreasing after the deflection of the part of the external paneling, thus enabling the part of the external paneling to move counter to the pressure of the fluid.

The pressure of the fluid acting on the deflected part of the external paneling can be reduced, for example, by some of the fluid being discharged by corresponding outflow openings being provided for discharging the fluid. In addition, the size of these outflow openings may be controllable in order to be able to set the pressure of the fluid in a specific manner as a function of the time.

The triggering of the deflecting device may take place, for example, pyrotechnically, it furthermore also being possible for the production or release of a gas used for deflecting the external paneling to take place pyrotechnically.

According to one embodiment, the deflecting device comprises an element which can be filled with fluid to produce the pressure, for example an inflatable airbag, which acts on the part of the external paneling that is to be deflected. According to another embodiment, the deflecting device has a piston (e.g. guided in a cylinder) which acts on the part of the external paneling which is to be deflected and is moved, for example, by means of a pressure produced by a fluid.

According to another variant of the time control of the deflecting device, the deflecting device can be locked in such a manner that, in the locked state, it does not permit any movement of the deflected part of the external paneling counter to the deflecting device, the locking being releasable by the impact of a body part (e.g. the upper body) of a person against the external paneling, so that, upon a further impact (e.g. of the head), the deflected part of the external paneling can move counter to the deflecting direction. The locking may take place, for example, by means of a hook which is released owing to the force produced upon a first impact.

According to a further variant of the invention, the deflecting device permits a movement of the deflected part of the external paneling counter to the deflecting direction Only upon the impact of a body part of a person within a certain region of this part. This region is selected in such a manner that it precisely encompasses those points of the part of the external paneling against which, according to the available experimental values, the head of a pedestrian or of a cyclist impacts during a typical accident sequence.

In one preferred embodiment, that region encompasses in particular those points of the external paneling on which the deflecting device acts. To this end, the deflecting device may act on the external paneling via an elastically or plastically deformable element. The corresponding element may also be of multipart design, with the result that the deformability is achieved by the movement of two components of the element with respect to each other, for example by the movement of a piston in a cylinder.

When a person impacts against the external paneling of the motor vehicle in the environment of the elastically or plastically deformable element, said element is deformed in such a manner that the deflected part of the external paneling can move counter to the deflecting direction (with deformation of each element).

The deformable element can be formed, for example, by a spring-elastic element, by a flexible coupling element of the deflecting device (e.g. in the form of a flexible traction means) or by a telescopic element (e.g. in the form of a piston guided in a cylinder).

As an alternative or in addition to a deformable element, provision may be made for the deflecting device to be of reversible or at least partially reversible design, so that, upon the impact of a body part of a person (within a certain region of the external paneling), those elements of the deflecting device which serve for deflecting the external paneling directly permit the part of the external paneling to move counter to the deflecting device.

According to a further variant of the invention, the deflecting device permits a movement of the deflected part of the external paneling counter to the deflecting direction only if the impact of a body part of a person against the external paneling takes place along a certain, specifiable directional region (corresponding to a specified region of possible force application directions).

This may be achieved, for example, by the use of a deformation element which can be deformed only upon an impact with a force application direction within the specified solid angle region. According to another embodiment with a reversible or partially reversible deflecting device, the latter, on account of its reversibility, only permits a movement of the external paneling if the force exerted on the deflecting device has a direction which lies within the specified directional region.

For deflecting part of the external paneling of the motor vehicle, the deflecting device may have, for example, a lever mechanism with at least one pivotable lever. On the other hand, the deflecting device may comprise a movably guided traction means which is tightened for the deflection of part of the external paneling.

In order to permit a movement of the deflected part of the external paneling counter to the deflecting direction, the pivotably mounted lever of the deflecting device is pivoted in the opposite direction and the part of the external paneling that is to be moved is moved counter to the tensioning of the traction means. In this case, the pivotable lever and the traction means may be arranged and designed in such a manner that a movement of the deflected part of the external paneling counter to the deflecting direction is possible only if the force exerted by the impact of a body part (in particular the head) of a person acts on the deflected part in a certain subregion and/or with a certain direction.

In a corresponding manner, provision may also be made, in the case of part of the external paneling being deflected by means of a piston, for the piston to be arranged in such a manner and to be guided in such a manner that a movement of the deflected part counter to the deflecting direction is possible only upon an impact against a certain region of the deflected part and/or upon a certain force application direction.

In a development of the invention, the deflecting device is coupled to an elastic element which pretensions the deflecting device in the deflecting direction. Furthermore, a locking element is provided which opposes a deflection of the corresponding part of the external paneling by the deflecting device and which, in the event of a crash, can be unlocked either under control by a sensor or by the force produced during the impact of a person.

The solution according to the invention can be used particularly advantageously for deflecting (raising) a flap of a motor vehicle, for example the engine hood or the trunk flap, in the event of a crash, in which case the application point of the deflection device is preferably to be arranged in the region of that end of the corresponding flap which is on the passenger compartment side.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3a shows a modification of the exemplary embodiment from FIG. 2a;

FIG. 3b shows the arrangement from FIG. 3a after the raising of the engine hood;

FIG. 4a shows a schematic illustration of an arrangement for raising an engine hood using a traction means;

FIG. 4b shows the arrangement from FIG. 4a after the raising of the engine hood;

FIG. 5a shows a development of the exemplary embodiment from FIG. 4a;

FIG. 5b shows the arrangement from FIG. 5a after the raising of the engine hood;

FIG. 6a shows a schematic illustration of an arrangement for raising an engine hood using a pivot lever and a spring acting thereon;

FIG. 6b shows the arrangement from FIG. 6a after the raising of the engine hood;

FIG. 8a shows a schematic illustration of an arrangement for raising an engine hood using a pivotably mounted piston;

FIG. 8b shows the arrangement according to FIG. 8a after the raising of the engine hood;

FIG. 10 shows a schematic illustration of an arrangement for raising an engine hood using an airbag which additionally covers regions of a motor vehicle that are adjacent to the engine hood;

DETAILED DESCRIPTION

Figure 1A:
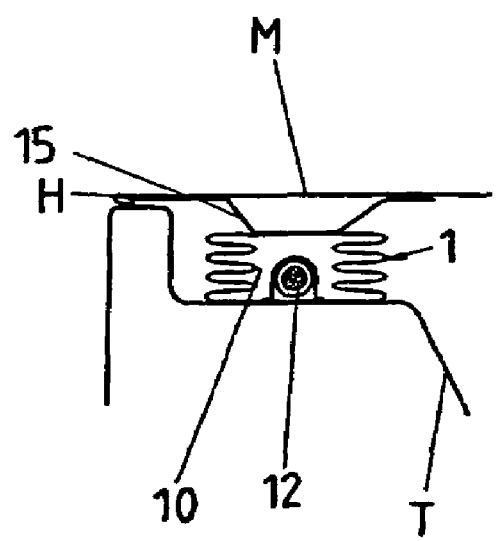
FIG. 1a shows a schematic illustration of an arrangement for raising an engine hood by means of an inflatable airbag.

FIG. 1a schematically shows an engine hood M of a motor vehicle in the region of its rear end H, i.e. in the region of its end facing the passenger cell, in particular the windshield.

In the region of an end H of the engine hood M, which is at the rear in the direction of travel and faces the passenger cell, a deflecting device 1 is arranged between a load-bearing structure T of the motor vehicle and the engine hood M. The deflecting device 1 can be used to raise the engine hood M in the event of a crash, to provide a deformation distance s (shown in FIG. 1b) for a person, e.g. a pedestrian or a cyclist, impacting against the engine hood M as a consequence of the accident. The deflecting device 1 includes an airbag 10, which is arranged on the load-bearing structure T of the motor vehicle. The airbag 10 can be inflated by means of a gas generator 12 and, in the folded state (shown in FIG. 1a), extends between the load-bearing structure T and the engine hood M. Arranged on the engine hood M above the airbag 10 is a force transmission element 15 via which the airbag 10 can act on the engine hood M.

If, by means of a "pre-crash sensor" in the form of a proximity sensor, a directly imminent, unavoidable accident is identified or if, by means of a contact sensor, an accident which is already taking place is identified, then the deflecting device 1 is triggered by the gas generator 12 being ignited. The gas generator 12 produces a gas by means of a pyrotechnic charge and/or releases an already stored gas which flows into the airbag 10, so that the latter is inflated and is deployed.

Figure 1B:
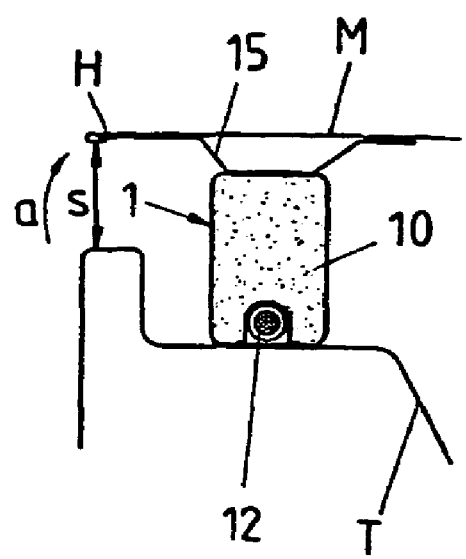
FIG. 1b shows the arrangement from FIG. 1a after the raising of the engine hood.

When the airbag 10 is inflated, it presses (via the force transmission element 15) against at least part of the engine hood M, so that the part is raised in a deviation direction a, as illustrated in FIG. 1b. In the completely inflated state of the airbag 10, the engine hood M is raised in the region of its rear end H by a defined distance s in relation to its starting position illustrated in FIG. 1a. This distance s defines the deformation distance that is available to a person (e.g., a pedestrian or cyclist) impacting against the engine hood M as a consequence of an accident. As a result, the impact energy of the person impacting the hood M in an impacting direction (which is counter to the deviation direction) can be dissipated in a controlled manner. Moreover, the likelihood of the person coming directly into contact with rigid vehicle parts (which may be situated behind the engine hood M, such as, for example, the engine block) is reduced.

To this end, the engine hood M should be sufficiently stable, so that it can be raised, without being damaged, by means of an airbag 10, which can be inflated very rapidly within milliseconds. In addition, the engine hood M should be sufficiently flexible, so that an impacting person does not sustain severe injuries due to the rigidity of the engine hood M.

Immediately after the inflation of the airbag 10, the airbag 10 (as a result of the gas pressure existing in the airbag 10) forms an element that keeps the engine hood M stable in the raised position. Upon impact of a person against the engine hood M, the airbag 10 initially yields only to a small extent such that a substantial movement of the engine hood M counter to the deflecting direction a of the engine hood is not possible. That is to say, a first impact of a body part (e.g., an upper body) of the person involved in the accident against the engine hood M immediately after the upward deflection of the engine hood M by inflation of the airbag 10 does not result in the engine hood M being moved counter to the deflecting direction a. As a result, the energy of the initial impact is not substantially dissipated in a controlled manner. However, the deformation distance s is still available for a later, second impact (as hereafter described) and, therefore, the deformation distance is available to dissipate the energy of the second impact in a controlled manner.

During a later, second impact, a movement of the engine hood M counter to its deflecting direction a is made possible by the fact that the airbag 10 has vent openings as are known, for example, in the case of airbag modules for protecting vehicle occupants, through which the gas which has flowed from the gas generator 12 into the airbag 10 can be discharged again into the surroundings. By this means, the pressure within the airbag 10 decreases, so that during a later impact, e.g. of the head of a person, against the engine hood M, a considerably lower pressure opposes a movement of the engine hood M counter to the deflecting direction a. The engine hood M can then move counter to the deflecting direction a under the action of the force of the impact, in which case impact energy is now dissipated in a controlled manner and an injury to the head impacting against the engine hood M is prevented.

In this connection, it should be noted that even upon the first impact of the person with his upper body against the engine hood M, the deflecting device nevertheless still fulfills a second main function, namely of protecting the person against coming directly into contact with rigid vehicle parts placed below the engine hood M, such as, for example, the engine block.

As a result, the arrangement illustrated in FIGS. 1a and 1b is therefore used to protect a person impacting against the engine hood M during a first impact directly after the inflation of the airbag 10 against coming into contact with rigid vehicle parts placed below the engine hood M, by raising the engine hood M. Upon a later, second impact there is furthermore (additionally) still a controlled dissipation of impact energy with the engine hood M moving counter to the deflecting direction a.

Since, in the case of an accident-induced impact of a person against the engine hood of a motor vehicle, generally first the upper body and then the head impacts against the engine hood, the greatest possible protection is provided for the impacting head and, in particular, a reduction in the deformation distance s even before the impact of the head is prevented.

In a development of the arrangement illustrated in FIGS. 1a and 1b, the size of the vent openings serving for discharging gas from the airbag 10 can be time-controlled, so that a certain, specified time window can be made available in a specific manner, in which a dissipation of impact energy is possible by the engine hood M moving counter to the deflecting direction a. In this case, provision may also be made, for example, for the force acting during a first impact against the engine hood M and the deflecting device 1 to change the size of the vent openings in such a manner that a certain specifiable pressure level is made available for the second impact of the person (with his head) that is to be anticipated within a certain period of time.

Figure 2A:
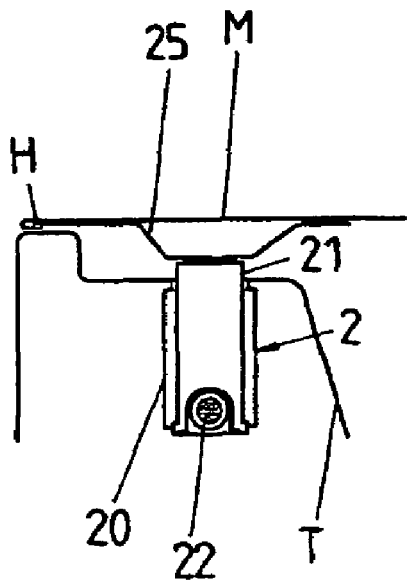
FIG. 2a shows a schematic illustration of an arrangement for raising an engine hood by means of a piston which can be moved by gas pressure.
Figure 2B:
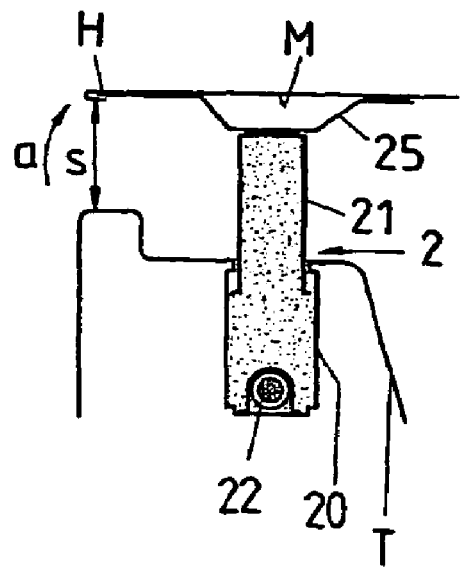
FIG. 2b shows the arrangement from FIG. 2a after the raising of the engine hood.

As modification of the exemplary embodiment illustrated in FIG. 1a, FIG. 2a illustrates an arrangement for raising the engine hood M, the deflecting device 2 comprising, instead of an airbag, a piston 21 which is guided in a cylinder 20, can be raised by a gas produced by means of a gas generator 22 and then, according to FIG. 2b, acts via a force transmission element 25 on the engine hood M in such a manner that the latter is raised by a defined distance s along a deflection direction a.

In this case too, the pressure with which the deflecting device 2 acts on the engine hood M in the region of its rear end H can be varied by gas being discharged from the piston/cylinder arrangement 20, 21. It is thereby possible, in the same manner as in the exemplary embodiment illustrated in FIGS. 1a and 1b, for a movement of the engine hood M counter to the deflecting direction a to initially still not be possible directly after the engine hood M has been deflected by means of the piston 21 whereas, at a later instant, after gas has been discharged from the deflecting device 2, the engine hood M can be moved counter to the deflecting direction a, with the piston 21 again being displaced a certain amount into the cylinder 20.

FIG. 3a illustrates a modification of the arrangement from FIG. 2a, according to which the deflecting device 2, comprising a cylinder 20 with piston 21 (compare FIG. 3b), is connected to the engine hood M in the region of its rear end H on the passenger-cell side via a force transmission element in the form of a deformation element 26. This deformation element 26 can be of such elastically deformable design that it yields when a person impacts against the engine hood M in the environment of the deformation element 26, and thus permits a movement of the engine hood M counter to the direction a along which it had been raised previously, according to FIG. 3b, by the piston 21 of the deflecting device 2 being raised.

The deformation element 26 can be provided as an addition or alternative to the time control of the deflecting device 2 that is described with reference to FIGS. 2a and 2b. That is to say, the deformation element 26 permits the engine hood M to move counter to the deflecting device a even if the piston 21 cannot be pushed back into the cylinder 20 upon an impact of a body part against the engine hood M. However, it is important for the impact in the environment of the deformation element 26 to take place in the region of the rear end H of the engine hood M, i.e. in the region in which, during an accident, a person's head frequently strikes and then acts with a corresponding force $F_h$ on the engine hood M.

The design of the force transmission element (26) as a deformation element is in particular of importance if the deflecting device (2) is not of reversible design, i.e. the piston (21) cannot be pushed back again into the associated cylinder 20 under the action of the force ($F_h$) occurring during the impact of the head.

By contrast, forces $F_b$ which arise from an impact in the region of the front end V of the engine hood M and arise, for example, from the impact of a person's legs do not result in a deformation of the deformation element 26 and therefore in the engine hood M moving counter to its deflecting direction a. This is, inter alia, a consequence of the curved design of the engine hood M.

With the exemplary embodiment illustrated in FIGS. 3a and 3b, a spatial control of the deflecting device 2 (if appropriate in addition to the time control described with reference to FIGS. 1a to 2b) can therefore be achieved in such a manner that, after the engine hood M is raised, a movement counter to the deflecting direction a and the reduction in the deformation distance made available during the deflection only take place if the impact in the environment of the deflecting device 2 takes place at the rear end H of the engine hood M. Since the head of a pedestrian or cyclist involved in the accident frequently impacts in this region, this serves in turn for a special protection of the head of the corresponding person.

Furthermore, provision may be made for the force/distance characteristic of the deformation element 26 to be anisotropic, for example by a particularly severe deformation of the deformation element 26 being possible if the corresponding force $F_h$ acts essentially perpendicularly to the engine hood M, as is frequently the case upon an impact of a head.

In the exemplary embodiment, shown in FIG. 4a, of an arrangement for raising the engine hood M in the region of its rear end H facing the windshield W, the deflecting device 3 comprises a traction means 31 which engages at one end on a force transmission element 35 provided on the engine hood M and is arranged at the other end in a tensioning device 32. The flexible traction means 31 can be formed, for example, by a cable and is deflected at least once between its two ends by means of a deflecting element 30.

In the event of a crash the tensioning device 32 is activated and then, for example by means of a pyrotechnic charge or by means of an electric drive, exerts a tensile force on the traction means 31, so that the latter is tightened, with the engine hood M being raised, according to FIG. 4b, in the region of its rear end H. When the engine hood M is raised in the region of its rear end H, it pivots about a pivot, which is formed at its front end V, in the hood lock. The distance by which the engine hood M is raised in the region of its rear end H compared to its starting position (illustrated by dashed lines in FIG. 4b) depends here on the position of the deflecting element 30. The force with which the engine hood M is held in its raised position depends in turn on the tensioning of the traction means 31 that is produced by the traction device 32.

Upon an impact of a person's head against the engine hood M in the region of its rear end H as a consequence of an accident, the engine hood M can be moved counter to the deflecting direction a because of the impact force $F_h$ effective here counter to the action of the tensioning of the traction means, thus enabling impact energy to be dissipated in a controlled manner. In this case, the extent of the movement depends on the location of the impact in the region of the rear end H of the engine hood M and on the direction of the associated force $F_h$.

By contrast, impact forces $F_b$ which occur because of the impact of a body part, e.g. the legs, in the region of the front end V of the engine hood M, do not cause the engine hood M to move counter to the deflecting direction a. In this case too, the curvature of the engine hood M is again of importance.

If appropriate, the tensioning at which the traction means 31 is kept may also be varied in time, for example may be reduced with increasing duration of time after the deflecting device 3 has been activated.

FIG. 5a illustrates a development of the exemplary embodiment from FIG. 4a, in which, to raise the engine hood M, there is additionally provided a sloping plane 37 which is connected to the engine hood M via a deformation element 36 and which interacts with a rotationally symmetrical element 38 arranged in a positionally fixed manner on a load-bearing part of the motor vehicle. The design of the sloping plane 37, e.g. the length and inclination thereof, defines the distance by which the engine hood M is raised by tightening of the traction means 31 when the traction device 32 is activated, compare FIG. 5b. Since the sloping plane 37 is connected to the engine hood M via a deformation element 36, the possibility, described with reference to FIGS. 4a and 4b, of the engine hood M moving counter to the deflecting direction a under the action of appropriate impact forces is not obstructed.

In the arrangement, illustrated in FIG. 6a, for raising the engine hood M in the region of its rear end H in the event of a crash, the deflecting device 4 has a lever 41 which is mounted pivotably about a pivot 40 and is coupled at one end 41b (compare FIG. 6b) to a spring element 42. This spring element 42, which is designed as a tension spring, is fixed at the other end on a load-bearing body part T and exerts on the pivot lever 41 a force which has the tendency to pivot the latter about the pivot 40, in which case the engine hood M would be raised in the region of its rear end H. However, this pivoting movement is prevented by a hook 43 which acts on the pivot lever 41 and which prevents the pivoting movement which can be produced by the spring element 42.

If, as a consequence of an accident, a person impacts with a body part against the engine hood M in the region of the front end V, the impact forces $F_b$ arising in this case cause the hook 43 to be unlocked and to thereby release the pivot lever 41. The latter then pivots about its axis of rotation 40 under the action of the spring element 42 and, in the process, acts with its end 41a facing away from the spring element 42 against a force transmission element 45 arranged on the engine hood M in the region of its rear end H on the passenger-cell side, so that the engine hood M is raised there.

Even in its end position, illustrated in FIG. 6b, after the engine hood M is raised, the pivot lever 41 is still inclined in such a manner that it is pivoted by an impact force $F_h$, which acts in the region of the rear end H of the engine hood M and may arise, for example, by the impact of a person's head, counter to the action of the spring element 42 in such a manner that the engine hood M can be lowered counter to its deflecting direction a. In this case, the spring constant of the spring element 42 determines the impact force required for moving the engine hood M. By contrast, the inclination of the pivot lever 41 in the deflected state of the deflecting device 4 defines the directions of the force $F_h$ which may trigger a pivoting-back of the lever 41. The less the pivot lever 41 is inclined with respect to the vertical, the smaller is the directional region within which the direction of the force $F_h$ has to lie in order to trigger a pivoting-back of the lever 41.

All in all, the selectable parameters which are important in this deflecting device 4 comprise the spring constant of the spring element 42, the lengths of the two lever arms of the pivot lever 41, the mass of the engine hood M and the period of time required for raising the engine hood M.

In the arrangement illustrated in FIGS. 6a and 6b, a first impact of a body part of a person against the engine hood M therefore firstly releases the deflecting device 4 which then causes the engine hood M to be raised and thereby makes available a deformation distance for a subsequent, second impact, in particular of the head of the corresponding person.

Figure 7:
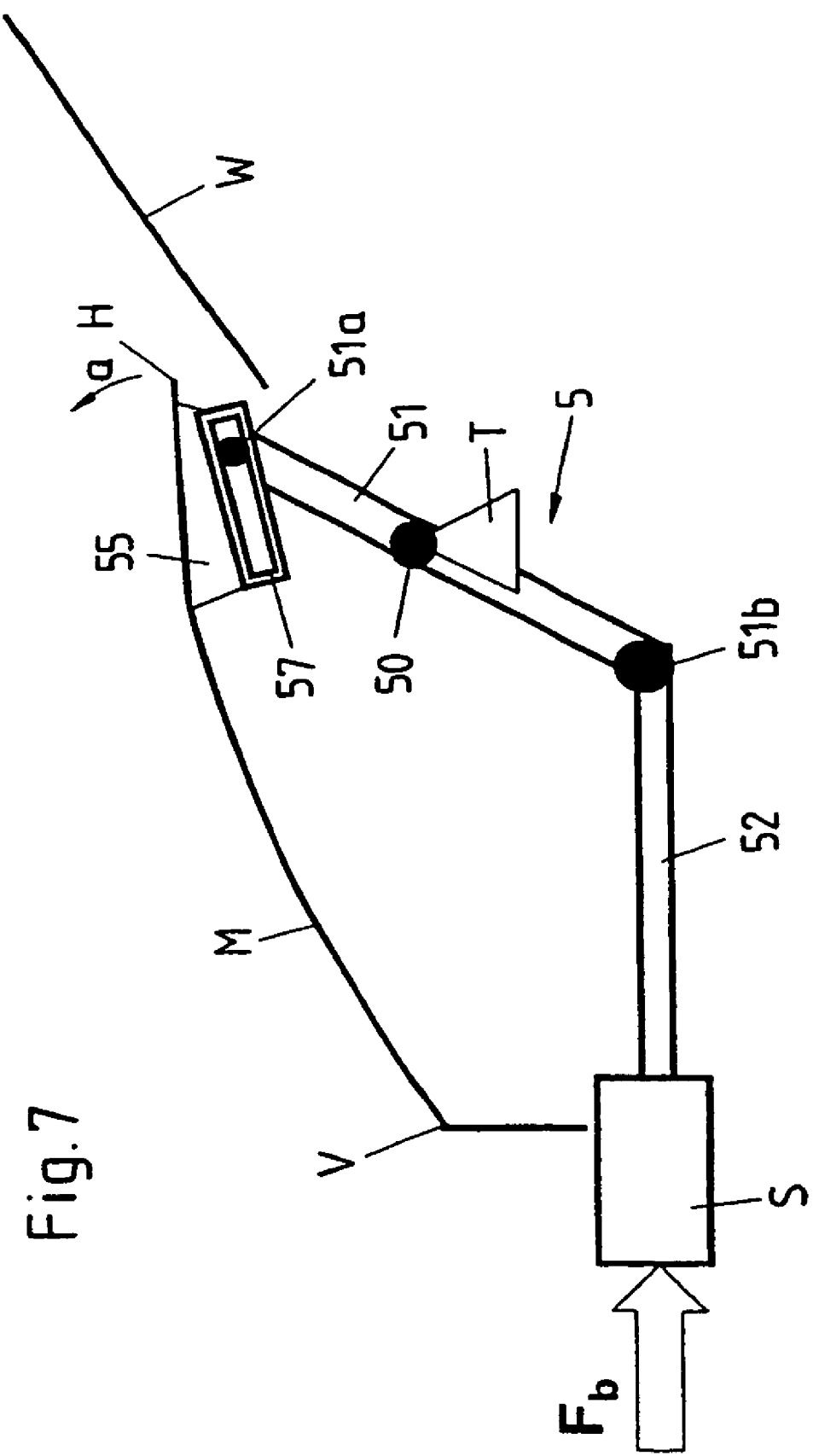
FIG. 7 shows a schematic illustration of an arrangement for raising an engine hood using a lever system.

In the exemplary embodiment illustrated in FIG. 7, the deflecting device 5 for raising the engine hood M in the event of a crash comprises a lever arrangement 51, 52 with a pivot lever 51, which is mounted pivotably about a pivot 50, and a push rod 52, which is coupled to a bumper S of the vehicle. The push rod 52 is connected in an articulated manner to the lower end 51b of the pivot lever 51. The upper end 51a of the pivot lever 51 is guided in a longitudinal guide 57 which is fixed in turn on the engine hood M via a deformation element 55. In this case, the deformation element 55 and the longitudinal guide 57 are arranged in the region of the rear end H of the engine hood M directly in front of the windshield W of the motor vehicle. If, in the event of a crash, a force $F_b$ triggered by the impact of a person acts on the bumper S, then the latter triggers a movement of the push rod 52 rearward in the longitudinal direction of the vehicle (counter to the forward direction of travel) which, in turn, produces a pivoting movement of the pivot lever 51 about the axis of rotation 50. This raises the engine hood M in the region of its rear end H, the upper end 51a of the pivot lever 51 sliding in the longitudinal guide 57. As a result, a deformation distance is made available for a subsequent, second impact against the engine hood M of the person affected by the accident, in particular for the impact of the person's head against the engine hood M. Depending on the location and direction of the impact in the region of the rear end H of the engine hood M, the deformation element 55 and, if appropriate, a pivoting-back of the pivot lever 51 make it possible for the engine hood M to move counter to the deflecting direction A.

In the arrangement, illustrated in FIG. 7, for raising the engine hood 7, instead of a lever mechanism a traction means or a sloping plane may also be provided as the deflecting means, in which case the latter would have to be coupled in each case to the bumper S. Furthermore, the bumper S can interact with the push rod 52 via a step-up ratio in order to increase the displacement distance of the push rod 52.

FIG. 8a illustrates an arrangement for raising the engine hood M, the deflecting device 6 of which is formed, as in the exemplary embodiment illustrated in FIG. 3a, by a piston 61 which is guided in a cylinder 60 (compare FIG. 8b) and can be deflected by a gas-producing device 62 in order to raise the engine hood M in the region of its rear end H. The coupling of the piston 61 to the engine hood M also takes place here via a force transmission element 65. In contrast to the exemplary embodiment according to FIG. 3a, in the present case the cylinder 60 is mounted pivotably about a pivot D on a load-bearing motor vehicle part T.

After the deflecting device 6 has been activated by means of a suitable sensor, the piston 61 and therefore also the engine hood M according to FIG. 8b are raised, the cylinder 60 simultaneously being pivoted slightly about the axis of rotation D. The compressive force $F_f$ existing in the cylinder 60 keeps the engine hood M in its deflected position. Upon an impact of a body part, in particular the head, of a person against the engine hood M in the region of its rear end, said engine hood can be moved counter to its deflecting direction a for the controlled dissipation of the impact energy if the force $F_h$ associated with the impact opposes the force $Ff$ produced by the gas in the cylinder 60.

If, by contrast, an impact force $F_b$ acts in the region of the front end V of the engine hood M, which force is caused by a body part impacting there, then this does not result in the engine hood M moving counter to the deflecting direction a, since the corresponding force $F_b$ does not have a component or a sufficiently large component opposing the force $Ff$ exerted by the piston 61.

Furthermore, provision may be made for the piston 61 (e.g. in the region of its piston rod) to interact with clamping elements which oppose a displacement of the piston 61 counter to the deflecting direction a, the arrangement being designed in such a manner that the clamping forces in a typical impact of the upper body of a person are significantly greater than in the impact of the head, specifically in such a manner that a displacement of the piston 61 counter to the deflecting direction a is possible only in the case of an impact of a head.

Figure 9A:
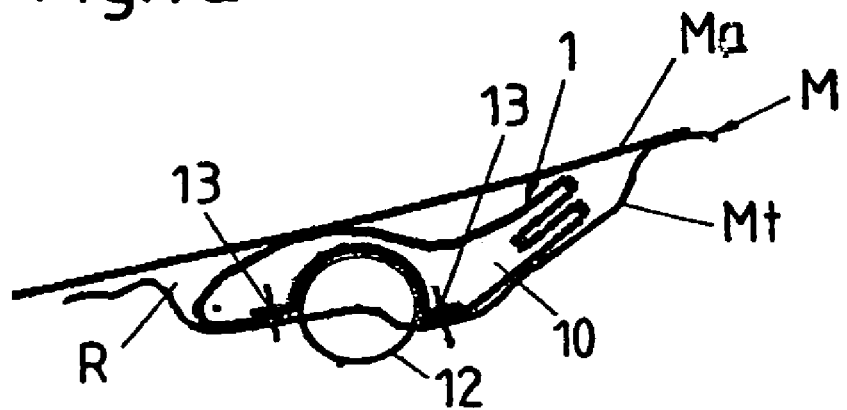
FIG. 9a shows a schematic illustration of an arrangement for raising the outer side of an engine hood by means of an inflatable airbag.

FIG. 9a shows a modification of the exemplary embodiment from FIG. 1a, in which the deflecting device 1, which has an inflatable airbag 10, is arranged between a support structure Mt and the external paneling (outer side Ma) of the engine hood. That is to say, in the present case the engine hood M is of two-part design with a comparatively stable support structure Mt and an outer side Ma determining the external design of the engine hood M. According to FIG. 9a, the airbag 10 is arranged in the folded state between these components of the engine hood M, the support structure Mt of the engine hood M having a corresponding depression R for accommodating the airbag 10 and a gas generator 12, which protrudes into the airbag 10, for inflating the airbag. The airbag 10 and the gas generator 12 are jointly fastened to the support structure Mt of the engine hood M by means of suitable fastening elements 13 (e.g. in the form of screws or rivets).

Figure 9B:
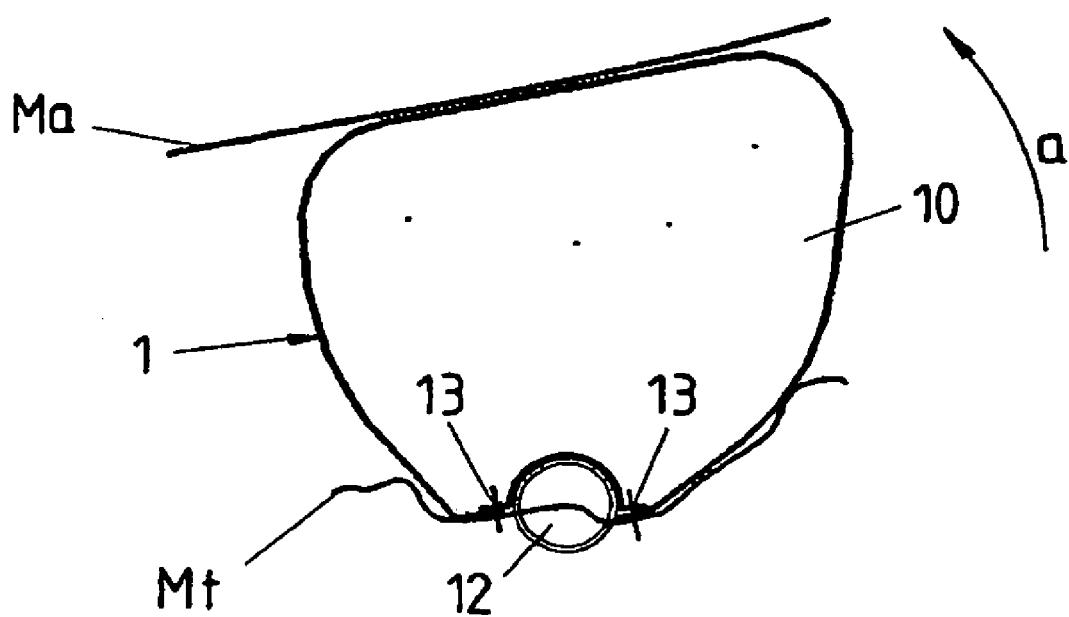
FIG. 9b shows the arrangement from FIG. 9a after the raising of the engine hood.

If a directly imminent accident or an accident which has already occurred is detected by a sensor, the airbag 10 is inflated by means of the gas generator 12 and, as a result, as can be seen with reference to FIG. 9b, the outer side Ma of the engine hood M is lifted off the support structure Mt. By this means, a deformation distance for a pedestrian or cyclist impacting against the outer side Ma of the engine hood M is again made available. The airbag 10 can be controlled in the same manner as described above with reference to FIGS. 1a and 1b. That is to say, by a specific discharge of gas out of the airbag 10 after the outer side Ma of the engine hood M has been raised, the pressure level within the airbag 10 and therefore also the force with which the airbag 10 acts on the outer side Ma of the engine hood M can be varied in time. This takes place in particular with regard to setting a pressure level at the instant of a probable impact of the head of a person who is involved in the accident and is situated outside the motor vehicle, the pressure level permitting the outer side Ma of the engine hood M to move counter to its deflecting direction.

Due to the comparatively low rigidity of the outer side Ma of the engine hood M compared with a complete engine hood comprising the support structure Mt and outer side Ma, the airbag 10 has to have a comparatively large volume in order to support the outer side Ma of the engine hood M over an extensive area. This also permits the airbag 10 to be subdivided into a plurality of chambers, of which the chambers to be assigned to an impacting upper body are filled first and with a comparatively high internal pressure while the chambers assigned to an impacting head (situated in the region of the rear end of the engine hood M) are filled following this and with a comparatively low internal pressure. This may be ensured, for example, by means of overflow openings through which gas flows out of the chambers assigned to the upper body into the chambers assigned to the head. As an alternative, a plurality of airbags which are filled in a manner offset in terms of time and with different internal pressures may be provided for the different impact regions.

In the exemplary embodiment illustrated in FIG. 10, an airbag 10 again serves as the deflecting device 1 for raising the outer side Ma of an engine hood M with respect to the support structure Mt thereof in order to protect a person situated outside the motor vehicle in the event of an accident. In this case, the airbag, in the inflated state, is supported at one end on the support structure Mt and acts at the same time on the outer side Ma of the engine hood M in such a manner that the latter is deflected.

The airbag 10 here is designed in such a manner that it protrudes with a rear section 100 behind the rear end H of the engine hood M and protrudes with a further section 101 laterally next to the engine hood M. A corresponding, laterally protruding section of the airbag 10 may also be provided on the other, opposite side of the engine hood M. These sections 100, 101 of the airbag 10 that protrude next to the engine hood can be used to cover additional regions of the vehicle body, such as, for example, fenders, the A-pillars and the frame of a window. This further reduces the risk of injury for a person situated outside the motor vehicle.

At the same time, this design of the airbag 10, which supports the outer side Ma of the engine hood M in the inflated state both in the region of its rear end H and in the region of its longitudinal sides S, provides a particularly homogeneous impact surface for an impacting person, so that a comparatively soft interception of the head, the upper body or other body parts of an impacting person is possible uniformly over the entire engine hood M.

The arrangement according to FIG. 10 can also be used in the same manner for the situation in which not only is the outer side Ma of the engine hood M, but also the entire engine hood M raised by a deflecting device 1 in the form of an airbag 10.

Figure 11:
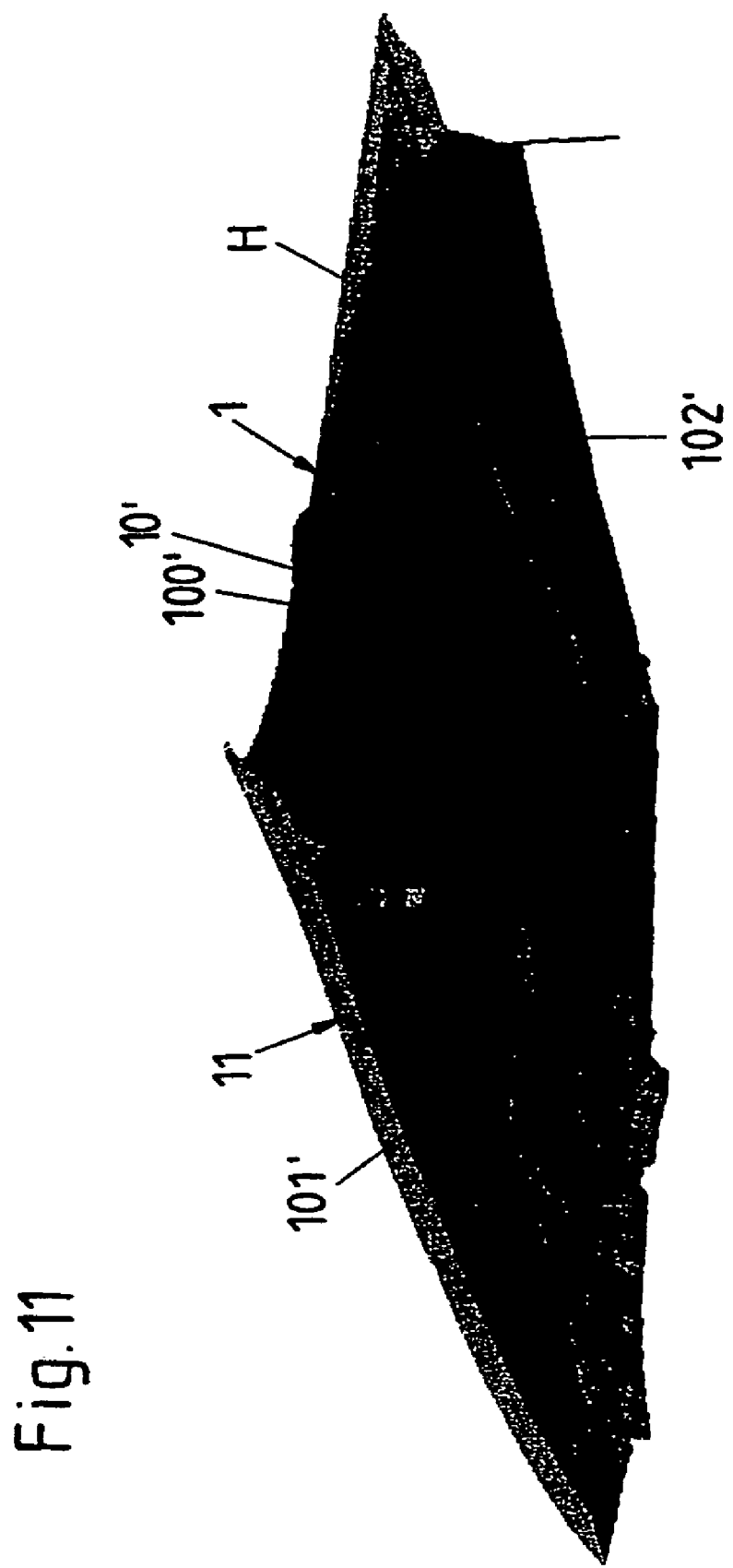
FIG. 11 shows a schematic illustration of an arrangement for raising an engine hood using an airbag which extends along the outer edges of the engine hood.

In the exemplary embodiment according to FIG. 11, the engine hood M is raised in its entirety, in the event of an accident, by a deflecting device 1 in the form of an essentially U-shaped airbag 10' which extends with its base section 100' along the rear end H of the engine hood M and with its two limbs 101', 102', which are angled away from the base region 100', below the engine hood M along the longitudinal sides S thereof. The engine hood M is therefore supported in the raised state on three sides by means of the airbag 10'.

In the case of this arrangement too, homogeneous conditions are made available over the entire surface of the engine hood M in the raised state of the engine hood M in order to intercept a person impacting against the engine hood M, irrespective of the location of the impact against the engine hood M, as softly as possible by the engine hood M being moved counter to its deflecting direction.

In the exemplary embodiments, illustrated with reference to FIGS. 1a to 11, of an arrangement for raising an engine hood in order to protect a person situated outside the motor vehicle, the engine hood M is pivoted in each case about its front end V (e.g. about a front lock subassembly) and, in the process, is raised in particular in the region of its rear end H. On the other hand, it is necessary, in order to swing up the engine hood in the event of a repair, to change the oil or for other reasons, to be able to pivot the engine hood H about its rear end too. That is to say, the engine hood M has to be coupled in each case, on the one hand, in the region of its rear end H pivotably to the vehicle body in order to be able to swing said engine hood up for repair purposes, and, on the other hand, it has to be able to be raised in the region of its rear end H in order to enable the protective function according to the invention in an accident involving a person situated outside the motor vehicle.

Figure 12A:
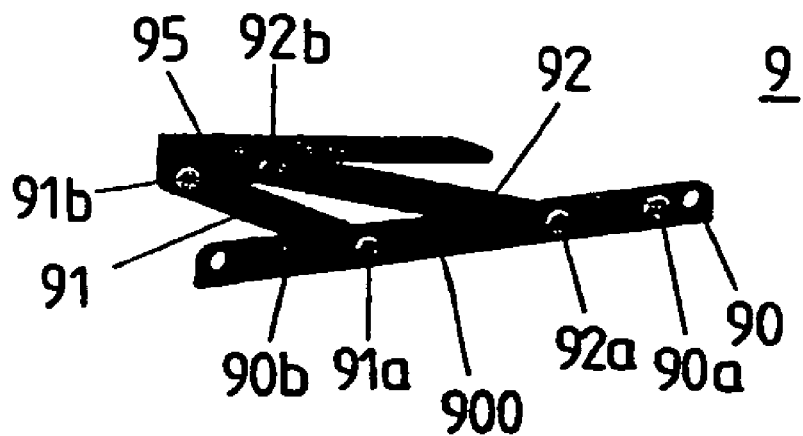
FIG. 12a shows a hinge for an engine hood for use in one of the arrangements according to FIGS. 1a to 11.

A hinge with which these stipulations can be fulfilled is illustrated in FIG. 12a. The hinge 9 has a base part 90 which is fixed on the vehicle body, and an upper part 95 which can be pivoted with respect to the base part 90 and can be connected to an engine hood. The upper part 95 is connected to the base part 90 via two adjusting levers 91, 92 which are connected in an articulated manner in the region of their lower ends, in each case via hinge points 91a, 92a, to a retaining element 900, which is connected to the base part 90, and in the region of their upper ends, in each case via further hinge points 91b, 92b, to the upper part 95 of the hood hinge 9. This enables the upper part 9 to be pivoted with respect to the base part 90 by means of the adjusting levers 91, 92, the engine hood being pivoted about its rear end, so that the front end of the engine hood swings upward and that region of the vehicle which is concealed by the engine hood becomes accessible.

Figure 12B:
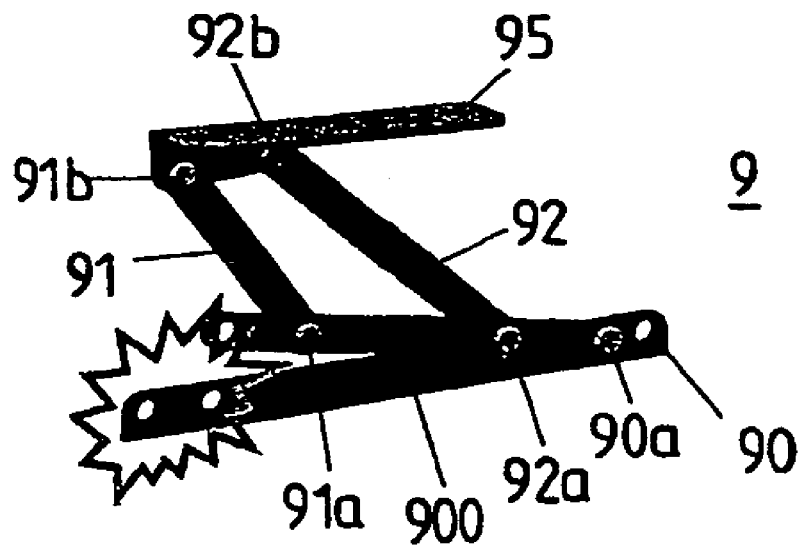
FIG. 12b shows the hinge according to FIG. 12a after the raising of an engine hood.

The retaining element 900, to which the two adjusting levers 91, 92 are pivotably coupled by their lower ends, is connected to the base part 90 by means of two fastening elements 90a, 90b, e.g. in the form of rivets. The fastening elements 90a, 90b of the elongated retaining element 900 are provided here on the two ends of the retaining element on the longitudinal side. The front fastening element 90b in the direction of travel—in the case of the hood hinge 9 being arranged in a motor vehicle in the region of the rear end of an engine hood—is designed in such a manner or has such a region of weakening that the front connection between the base part 9 and the retaining element 900 can be released in order to raise the rear end of the engine hood. This is because, after the front fastening element 90b is released, the rear fastening element 90a acts as a joint, with the result that the retaining element 900 can be pivoted about this rear joint 90a with respect to the base part 9. This is illustrated in FIG. 12b. The retaining element 900 then forms with the two adjusting levers 91, 92 a lever arrangement which permits an essentially vertical raising of the rear end of the corresponding engine hood, as is required in the case of the arrangements illustrated in FIGS. 1a to 11.

The design, illustrated in FIGS. 12a and 12b, of a hood joint or hood hinge 9 is therefore based on the principle of the hood hinge being modified by the action of certain specifiable forces in such a manner that a raising of the rear end of an engine hood (which is coupled to the vehicle body via the hood hinge) is made possible. According to one alternative, the forces required for this can be applied by the deflecting device 1 (cf. FIGS. 1a to 11) itself, used for deflecting the engine hood M. According to another embodiment, a separate device may be provided acting specifically on a certain section of the hood hinge 9 in order to modify the latter in such a manner that the raising of the rear hood end of the engine hood is made possible.

Of course, it is also conceivable to completely decouple the engine hood in the region of its rear end from the vehicle body by destruction of the hood hinge 9. To this end, the adjusting levers 91, 92, for example, could be uncoupled either from the base part 90 or from the upper part 95. The embodiment, illustrated in FIGS. 12a and 12b, of a hood hinge which, for raising the rear end of an engine hood, is merely modified, but not destroyed, has the advantage of enabling the hood hinge 9 to be used at the same time to limit the raising of the engine hood M by means of the deflecting device (in the manner of an intercepting strap), so that excessive raising is avoided. This is because this could in turn result in an impacting person striking against the rear edge of the engine hood, which could increase the risk of injury.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. An automotive safety apparatus for protecting a person located outside an automobile from an impact with a part of external paneling of the automobile comprising:

a device configured to deflect the part of the external paneling of the automobile in a first deflecting direction from a first position to a second position, wherein after the device has deflected the part of the external paneling to the second position, the device is configured to oppose and control movement of the part of the external paneling in a second direction counter to the first deflecting direction, the device including an element which, upon an impact of a person against the deflected part in which impact forces act counter to the first deflecting direction, can oppose a movement of the deflected part of the external paneling counter to the first deflecting direction in order to prevent the movement of the deflected part into the second direction, and wherein the device is configured to control movement of the part of the external paneling in the second direction counter to the first deflecting direction based upon the time of impact with the person in such a manner that, as a function of an instant of the impact against the part of the external paneling deflected to the second position, the device permits a movement of the part of the external paneling counter to the first deflecting direction or opposes such a movement in order to prevent the movement of the part counter to the first deflecting direction.

2. The apparatus of claim 1, wherein the device is configured to use gas pressure to deflect the part.

3. The apparatus of claim 2, wherein the device is configured so that the pressure of the gas is controlled over time to decrease after deflection of the part of the external paneling in the first deflecting direction.

4. The apparatus of claim 3, wherein the device is configured so that the pressure of the fluid acting on the deflected part of the external paneling is reduced by discharging some of the gas.

5. The apparatus of claim 4, wherein the device includes vent openings for discharging gas.

6. The apparatus of claim 5, wherein the device is configured so that the size of the vent openings can be controlled.

7. The apparatus of one claim 2, wherein the gas pressure is produced pyrotechnically.

8. The apparatus of claim 1, wherein the device can be triggered pyrotechnically.

9. The apparatus of claim 1, wherein the device comprises an element which can be filled with fluid so that when the element is filled the element applies a force to the part of the external paneling.

10. The apparatus of claim 1, wherein the device comprises a piston which can apply a force on the part of the external paneling.

11. The apparatus of claim 10, wherein the piston is configured to receive a fluid for extending the piston.

12. The apparatus of claim 10, wherein a movement of the piston in the second counter to the deflecting direction can be triggered only upon an impact against the part of the external paneling within a specified directional region.

13. The apparatus of claim 1, wherein the device is lockable in order to prevent any movement of the part counter to the deflecting direction; and wherein the locking of the device can be released in response to the impact of the person against the part so that the part is permitted to move counter to the deflecting direction.

14. The apparatus of claim 13, further comprising a hook for locking the device.

15. The apparatus of claim 1, wherein the apparatus is configured so that the deflecting device can be moved counter to the first deflecting direction only upon the impact of a body part of the person within a certain region of the part of the external paneling.

16. The apparatus of claim 15, wherein the region surrounds a location on the part against which the device applies a deflecting force.

17. The apparatus of claim 1, wherein the device includes an elastically or plastically deformable element.

18. The apparatus of claim 17, wherein the device is configured so that when a person impacts against the part of the external paneling, the elastically or plastically deformable element deforms to permit the part of the external paneling to move in the second direction counter to the first deflecting direction.

19. The apparatus of claim 18, wherein the deformable element comprises a spring-elastic element.

20. The apparatus of claim 18, wherein the deformable element comprises a flexible coupling element located between the deflecting device and the part.

21. The apparatus of claim 18, wherein the deformable element comprises a telescopic element.

22. The apparatus of claim 17, wherein the deformable element can be deformed only after an impact force is applied from a predetermined direction within a predetermined region of the part of the external paneling.

23. The apparatus of claim 1, wherein the device is reversible, so that a movement of the part of the external paneling counter to the deflecting direction is made possible by a movement of elements of the deflecting device in a direction counter to the first deflecting direction.

24. The apparatus of claim 1, wherein the deflecting device can be moved counter to the deflecting direction only upon the impact of a body part of a person against a predetermined region of the part of the external paneling.

25. The apparatus of claim 1, wherein device includes at least one element configured so that the device permits a movement of the part of the external paneling in the second direction counter to the first deflecting direction only upon an impact within a specified directional region of the part of the external paneling.

26. The apparatus of claim 1, wherein the device includes a lever mechanism for deflecting the part of the external paneling.

27. The apparatus of claim 1, wherein the device includes a movably guided traction mechanism for deflecting the part.

28. The apparatus of claim 26, wherein the lever mechanism includes at least one lever which can be pivoted to deflect the part.

29. The apparatus of claim 27, wherein the traction mechanism is configured to be tensioned to deflect the part.

30. The apparatus of claim 29, wherein the device is configured so that in order to move the part counter to the deflecting direction a load is applied to the traction mechanism counter to its tensioning.

31. The apparatus of claims 29, wherein the movement of the part counter to the tensioning of the traction mechanism is possible only upon an impact against the part within a specified directional region.

32. The apparatus of claim 1, wherein the device is coupled to an elastic element which pretensions the deflecting device in the deflecting direction.

33. The apparatus of claim 32, further comprising a locking element which prevents a deflection of the part by the device.

34. The apparatus of claim 33, wherein the locking element is configured to be released by the impact of a person against the part.

35. The apparatus of claim 1, wherein the device is configured to be activated by a first impact of the person against the vehicle, so that the part of the external paneling is deflected in the first deflecting direction.

36. The apparatus of claim 35, wherein the device is configured to be activated when the force produced during the impact acts on the device.

37. The apparatus of claim 1, wherein the device is configured to be activated based on a signal of a sensor coupled to the device.

38. The apparatus of claim 1, wherein the part of the external paneling is formed by a flap of the automobile.

39. The apparatus of claim 38, wherein the flap is an engine hood or a trunk flap with two ends,
   wherein one end of the flap faces a passenger compartment of the automobile, and
   wherein the other end of the flap faces a direction counter to the passenger compartment.

40. The apparatus of claim 39, wherein the device is applied at the end of the flap facing the passenger compartment of the automobile.

41. An automotive safety apparatus for protecting a person located outside an automobile from an impact with a part of external paneling of the automobile comprising:
   a device configured to deflect the part of the external paneling of the automobile in a first deflecting direction from a first position to a second position,
   wherein after the device has deflected the part of the external paneling, the device is configured to oppose and control movement of the part of the external paneling in a second direction counter to the first deflecting direction,
   wherein the device is configured to control movement of the part of the external paneling in the second direction counter to the first deflecting direction based upon either the time of impact with the person, the location of impact with the person, or the direction of impact with the person, and
   wherein the device permits a movement of the part of the external paneling in the second direction counter to the first deflecting direction only a predetermined time period after the initial deflection of the part of the external paneling in the first deflecting direction.

* * * * *

UNITED STATES PATENT AND TRADEMARK OFFICE
CERTIFICATE OF CORRECTION

PATENT NO. : 7,614,472 B2
APPLICATION NO. : 10/520627
DATED : November 10, 2009
INVENTOR(S) : Kalliske et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Nineteenth Day of October, 2010

David J. Kappos
*Director of the United States Patent and Trademark Office*